United States Patent [19]

Long et al.

[11] Patent Number: 4,984,249
[45] Date of Patent: Jan. 8, 1991

[54] METHOD AND APPARATUS FOR SYNCHRONIZING DIGITAL DATA SYMBOLS

[75] Inventors: James C. Long; Francis M. Baker, both of Sunnyvale, Calif.

[73] Assignee: First Pacific Networks, Sunnyvale, Calif.

[21] Appl. No.: 358,222

[22] Filed: May 26, 1989

[51] Int. Cl.$^5$ .............................................. H04L 7/04
[52] U.S. Cl. ...................................... 375/20; 375/109; 375/116; 375/119
[58] Field of Search ...................... 375/12–14, 375/95–106, 116–118, 119, 20–109, 114; 320/155; 364/728.03, 728.04, 728.06, 715.11

[56] References Cited

U.S. PATENT DOCUMENTS

| | | | |
|---|---|---|---|
| 4,242,755 | 12/1980 | Gauzan | 375/95 |
| 4,370,726 | 1/1983 | Caracappa | 364/728.06 |
| 4,606,050 | 8/1986 | Sekigawa et al. | 375/95 |

*Primary Examiner*—Benedict V. Safourek
*Attorney, Agent, or Firm*—Townsend and Townsend

[57] ABSTRACT

According to the invention, value errors in a recorded digital symbol are minimized by generating, from a high-speed sampling clock, a local clock which is synchronized to a selected sample time of a sampler which substantially over samples the received data stream, and then using the locally-generated clock to reconstruct the symbol synchronously with the locally-generated clock. The specific techniques are employed during the preamble of a synchronous system to select an optimum sample time for use in generating the local clock. Several specific techniques may be employed to mimize error. In order to find the center of a data symbol, particularly a binary digital data symbol in a digital data stream, a Read Only Memory (ROM) may be provided in which is stored all combinations of addresses of taps for the center of a symbol in response to address input representing the binary value of the signal in a shift register. The tap outputs of a shift register are coupled directly to the address inputs of a ROM of appropriate address width, and the ROM produces as its data output the address of the tap representing the center of the input symbol. The ROM can examine a plurality of sample time positions simultaneously.

19 Claims, 7 Drawing Sheets

METHOD AND APPARATUS FOR SYNCHRONIZING DIGITAL DATA SYMBOLS

BACKGROUND OF THE INVENTION

This invention relates to digital data communication in general, and more particularly to methods and apparatus for regenerating clock signal embedded in a synchronous digital data stream. The invention is generally applicable to the synchronization of digital symbols containing multiple bits. A proposed application of the invention is in a Maximum Likelihood Detector (MLD) wherein digital symbols are recovered and reconstructed. In a common application, the invention is applicable primarily to a binary-level digital data stream.

An important function in a communications system is the reconstruction or regeneration of the embedded clock signal from a received signal comprising a digital data stream of binary or multiple-bit symbols. The regenerated clock is used to decode the information contained within the digital data stream.

There are however many sources of error which can result in degraded synchronization of the clock signal and the accompanying data.

In the past, techniques used to sample digital bit streams have been based on considerable a priori information about the nature of the received data. A conventional UART (Universal Asynchronous Receiver Transmitter) includes the capability to sample a binary digital bit stream at a fixed offset from a leading edge of a start bit and all subsequent bits in the data unit (word). A conventional UART assumes that the source clock and the target clock are close enough in frequency that phase shift does not exceed a significant fraction of a bit in ten bits of information. This assumption, however, gives rises to problems in that slicing levels, that is, the conversion point between continuous analog levels and two digital levels, may be incorrectly set. This will cause an apparent bit width of one-type bits to differ from the apparent bit width of zero-type bits. The ideal sampling point is conventionally believed to be the center of any bit width. Because of the slicing errors, which cause a fixed offset from the leading edge of a start bit, conventional UART technology does not guarantee the sampling point to occur at the center of the bit. Hence, the sampling point does not normally occur where the signal-to-noise ratio is largest, the point of the least likelihood of error.

If the transmitting and receiving clocks are not closely synchronized in frequency, the sampling point can drift rapidly from the original position. As a consequence, the message length of any bit stream is limited by the relative phase coherence of the two clocks. Conventionally, the message length is limited to around ten bits to allow resynchronization of the clock edge after a preceding stop bit and on a subsequent start bit.

In a prior co-pending patent application, Ser. No. 07/317,213 filed Feb. 28, 1989, entitled: "Modulation and Demodulation System Employing AM-PSK and QPSK for Communications System Using Digital Signals" in the names of Robert P. McNamara, Timothy P. Murphy and James C. Long, there is described a method for synchronizing a transmit clock with a central receive clock which addresses the clock rate slip problem. In that method, only the phase of the error remained an unknown. Bit width variation caused by slicing level errors as described above was addressed and solved by measuring the width of a one-type bit so that the time relation between the rising edge and the falling edge could be used in the decision process for synchronization.

While the above method represents an improvement over the prior art, it is subject to a number of limitations. Due to the nature of the sampling process, the actual data edges can occur up to one sampling period earlier than indicated by the sampling output. As a consequence, the average error is one-half sample period late. There are other limitations which give an incorrect idea of the timing of the data edges. For example, if the sampling occurs near an edge (a transition point), noise may cause up to one sampling period of error on each edge. This gives rise to a potential maximum sampling error of one sampling period.

Round-off errors occur where the calculated bit width is an odd number of sample periods and division by two is used to find the center of the bit period. This is an error which can add up to one-half sampling period error in either direction.

In the foregoing method, only the one-type transitions are sampled and measured in order to find the center of a bit period. As a consequence, only half the number of available tries are used to find a correct sample point, since the preamble in a synchronous bit stream is alternating one's and zero's.

In the foregoing method, a timer is used to determine the end of a preamble. This requires a safety margin such that fewer bits than the number available are used to find the correct sample point in order to avoid measuring bits not in the preamble.

What is needed is a mechanism to address and minimize the likelihood of phase error and the resulting regenerated symbol value error as a result of symbol synchronization operations.

SUMMARY OF THE INVENTION

According to the invention, value errors in a recovered digital symbol are minimized by regenerating, from a high-speed sampling clock, a local clock which is synchronized to a selected sample time of a sampler which substantially over-samples the received digital data stream and by then using this locally-regenerated clock to reconstruct the symbol synchronously. The specific techniques are employed during the preamble of a synchronous system to select an optimum sample time for use in generating the local clock to minimize error. According to one option, in order to find the center of a data symbol, particularly a binary digital data symbol in a digital data stream, a Read Only Memory (ROM) may be provided in which is stored all combinations of addresses of taps for the center of a symbol in response to address input representing the binary value of the signal at each sample time in a shift register. The tap outputs of a shift register are coupled directly to the address inputs of the ROM, which is of appropriate address width, and the ROM produces as its data output the address of the tap representing the center of the input symbol. The ROM can be used to examine a plurality of sample time positions simultaneously.

An alternative technique, useful particularly with multiple-level symbols, is to employ a multiple-level template for one or more of the possible variations of a symbol caused by data or imperfection at the position of the signal value of the symbol and then to cross-correlate the input symbol with each of the templates to determine a best match whereby the best match is employed to designate the position of the peak or center of the symbol. A charge-coupled device may be employed as a shift register, and means may be provided to sample amplitude values at taps along the shift register. A plurality of sample time positions may also be examined simultaneously in accordance with this method.

A still further technique for improving synchronization and regeneration is to employ a bit value voting technique whereby, for example, several adjacent sample positions along a shift register are examined simultaneously after a symbol center has been selected. The data bit value is selected as the value represented by the majority of the bit samples examined. (This technique presumes that adjacent samples produce like values under ideal conditions.)

Still further techniques according to the invention may be employed to improve the estimate of the position of the center of the data symbol. When rounding is necessary, for example, one technique is to round early, that is, prior to the calculated center of the symbol in the received digital data stream. Early rounding compensates for a systematic late bias caused by the sampling process.

Still further, the widths of a plurality of adjacent symbols can be estimated simultaneously and then used to average out errors caused by noise sources. This technique minimizes sampling errors caused as a result of sampling occurring close to transition points, particularly in binary level signals.

A still further technique is to employ a predetermined number of high-speed clock cycles as an aid in finding the end of the preamble which precedes the information portion of a digital data stream so that the phase of the clock can be fixed. In a specific embodiment, if two adjacent bits of the same polarity occur, the sampling process will reveal that the edges of the bits exceed the maximum limit and signify the end of the preamble.

The invention will be better understood by reference to the following detailed description in connection with the accompanying drawings.

DESCRIPTION OF SPECIFIC EMBODIMENTS

Figure 1:
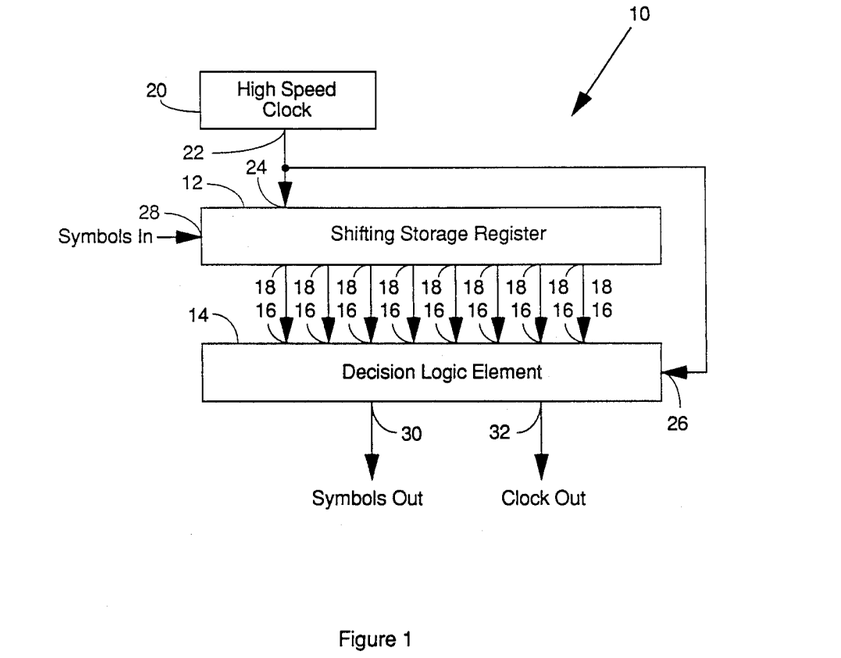
FIG. 1 is a block diagram of a data synchronization system employing a symbol synchronizer.

Referring to FIG. 1, there is shown a basic diagram of a symbol synchronizer 10 in accordance with the invention. The symbol synchronizer 10 comprises a shifting storage register 12, a decision logic element 14 having parallel inputs 16 coupled to parallel register outputs 18 of the shifting storage register 12, and a high speed clock 20 whose high speed clock output 22 is provided to the respective clock inputs 24, 26 of both the shifting storage register 12 and the decision logic element 14. The shifting storage register 12 has a symbol input 28 for a single line (serial) input of symbols. The decision logic element 14 has a symbol output 30 for a single line (serial) output of regenerated, resynchronized symbols, as well as a clock output 32 for the reconstructed synchronous output clock for use in connection with the resynchronized symbols.

The invention operates as follows. A digital symbol is received via symbol input 28 and a reconstructed symbol is provided at the symbol output 30 synchronously with a reconstructed local clock provided through clock output 32. The value errors in the recovered digital symbol at symbol output 30 are minimized by regenerating, from the high speed sampling clock 20 provided from high speed clock output 22, a local clock which is synchronized to a selected sample time of a sampler formed by the storage register 12. The storage register 12 substantially over-samples the received digital data stream and provides through synchronizer inputs 16 to the decision logic element 14 a substantial number of samples for each received symbol (or each received bit in a binary digital bit stream). Using the locally regenerated clock at clock input 26, the decision logic element 14 synchronously reconstructs the symbol and provides it through symbol output 30 synchronously with a reconstructed clock signal through system clock output 32 for subsequent use in a data communication system or the like.

Figure 2:
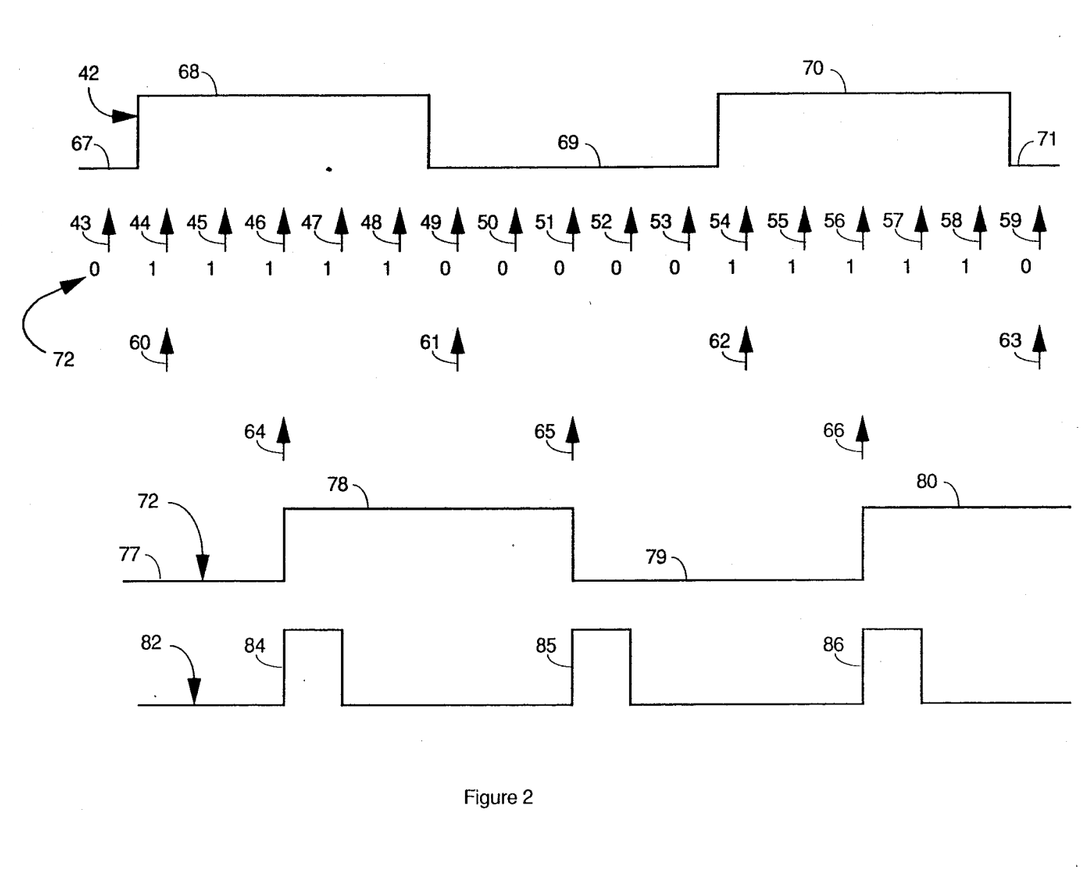
FIG. 2 is a timing diagram illustrating a received digital data stream, a decision point, edge recovery values, a recovered digital data stream an a locally regenerated clock in accordance with the invention.

FIG. 2 is a timing diagram illustrating an example of a binary level symbol digital data stream comprising binary level segments 67, 68, 69, 70 and 71. A received binary level analog signal 42 representative of a digital data stream is shown in relation to a plurality of decision points 43-59 in a sampled data system of FIG. 1. The decision points 43-59 are shown together with the binary values 72 measured at the respective decision points 43-59. The decision points 43-59 each represent the samples of values captured in the shifting storage register 12 and provided via register outputs 18 to the decision logic element 14.

Within the decision logic element 14, edge recovery values 60-63 are identified from the decision points 43-59. The edge recovery values 60, 61, 62, 63 are the times which respectively correspond to decision points 44, 49, 54, 59 immediately following a transition in the binary values. Hence, edge recovery value 60 is the time corresponding to decision point 44 which is the sample following the transition of binary value 0 to binary value 1 in the second binary-valued segment 68 of the received binary level analog signal 42. The sample points 64-66 are identified by the decision logic element 14 with consecutive binary valued segments 68, 69 and 70 of the digital data stream 42. The sample points 64, 65 and 66 are the times of the decisions points 46, 51 and 56 calculated to be closest to the center of the binaryvalued segments 68, 69 and 70, respectively.

The sample points 64, 65 and 66 are used as the edges to reconstruct an analog binary level signal 72 comprising binary level segments 77, 78, 79, 80 constituting the desired recovered digital data stream. Moreover, the sample points 64, 65 and 66 are used as the edges to reconstruct a locally regenerated clock in accordance with the invention constituting pulses 84, 85 and 86 exactly aligned with the edges of the reconstructed analog binary level signal 72. It will be noted that there is an approximate half-symbol offset in time of the recovered bits and the reconstructed clock relative to the input digital data stream 42. Since the synchronization process is contemplated to be unidirectional only, the shift in symbol synchronization in real terms is not relevant to its intended use.

Figure 3:
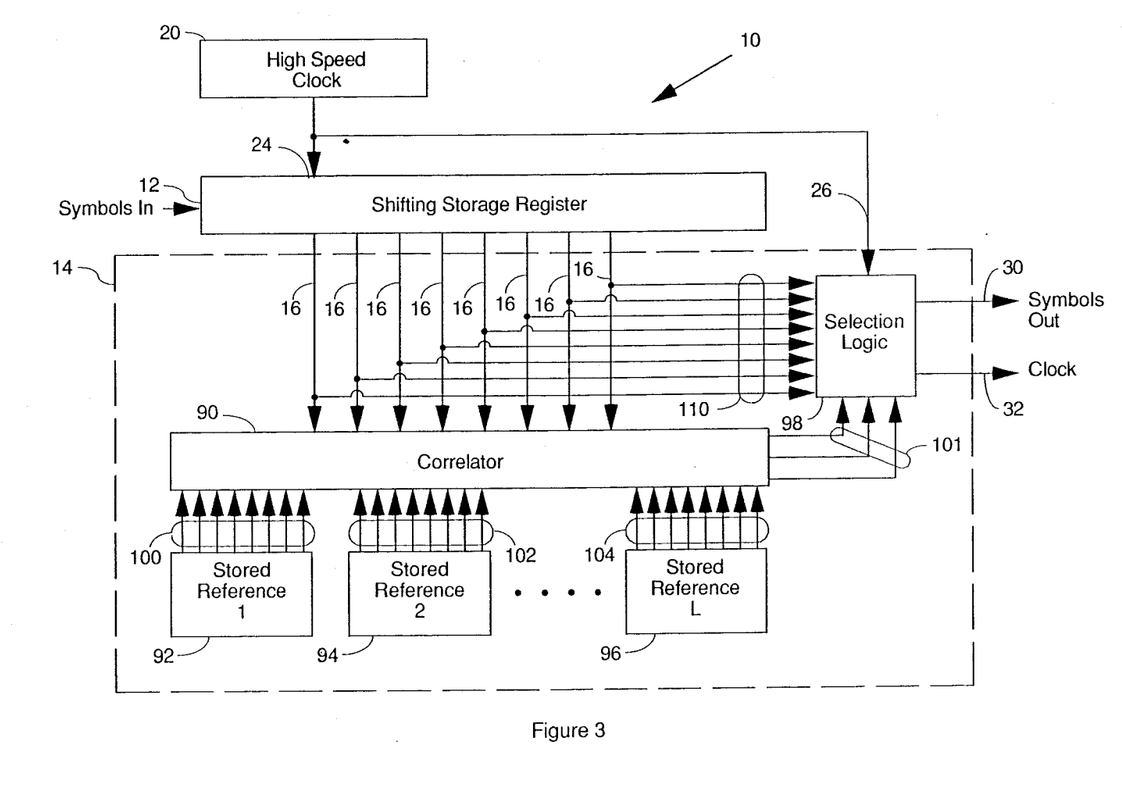
FIG. 3 is a block diagram of a first embodiment of a symbol synchronizer.

FIG. 3 illustrates a specific implementation of a decision logic element 14 in a symbol synchronizer 10 in accordance with the invention. Identical numerals refer to like elements of FIG. 1 and therefore need not be repeated. The decision logic element 14 comprises a correlator 90, a plurality of stored reference value sources 92, 94, 96, and selection logic 98. The correlator 90 is coupled to receive the synchronizer inputs 16 to the decision logic element 14 and to receive from each of the stored reference value sources 92, 94, 96 a corresponding number of model symbol inputs 100, 102, 104. The stored reference value sources 92, 94, 96 each provide a template for a single one of the acceptable "shapes" of symbols as sampled at selected data points. The symbols may differ in length (duration) of a selected amplitude and may differ in amplitude at selected sample points. The symbol sources may well provide as output a plurality of amplitude values at each one of the sample outputs. As many sample sources are provided as there are acceptable symbols.

The correlator 90 is a straightforward multiply and add cross correlator which cross correlates the inputs 16 with each one of the corresponding model symbol inputs 100, 102, 104 at each of the fast clock cycles from the high speed clock 20 to yield a correlation coefficient for each one of the model symbols from the model symbol sources 92, 94, 96. Preferably all of the correlation coefficients are communicated as a numerical value to selection logic 98 at symbol input 101, along with the input symbol from the shifting storage register 12 to input 110. Alternatively, only the highest correlation coefficient (representing the best match of the model symbols with the input symbol) is communicated to the selection logic 98.

The selection logic 98 examines the time sequence of the correlation coefficients and selects the highest value or the center of the contiguous time periods of those having the highest value. By knowledge of how far in the past such a correlation occurs, the selection logic 98 identifies which of the input signal lines through inputs 16 is the optimum to use as the decision point, and which corresponds to a known time. From this information, the selection logic 98, which has the appropriate combinatorial logic circuitry, identifies edge recovery 60, etc., and sample point 64, etc., reconstructs the symbol in appropriate segments 78, etc., and reconstructs or otherwise regenerates the local clock with pulses 84, etc.

Figure 4:
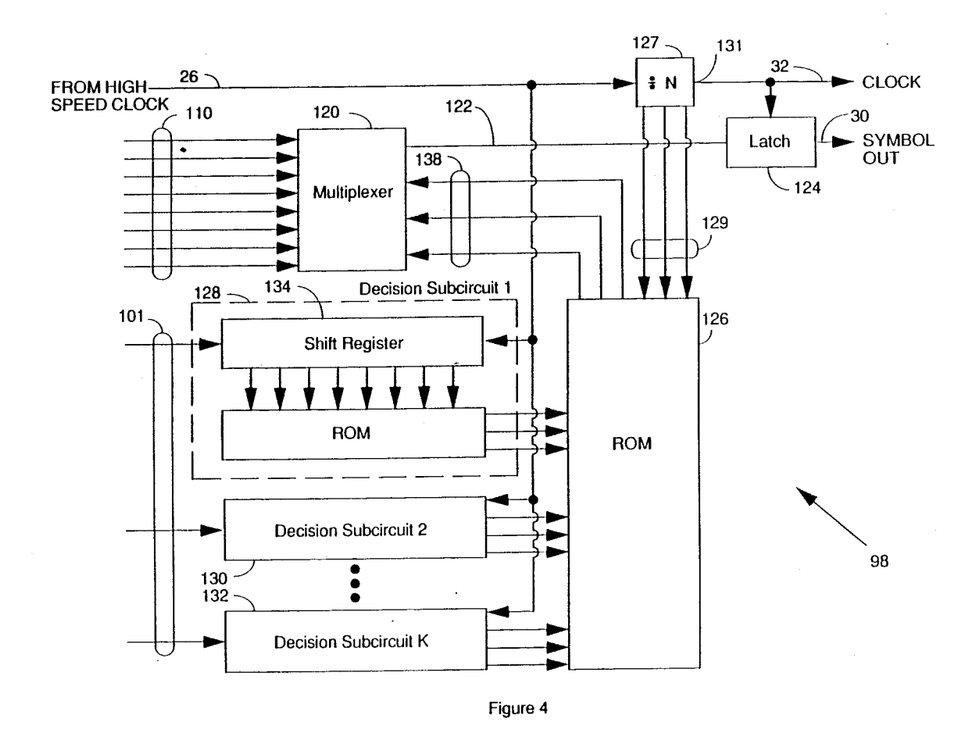
FIG. 4 is a schematic diagram of selection logic circuitry for the selection logic for performing symbol synchronization in accordance with the embodiment of FIG. 3.

Referring to FIG. 4, there is shown a preferred embodiment of selection logic circuitry 98 for the selection logic for performing symbol synchronization in accordance with the embodiment of FIG. 3. The selection logic circuitry 98 comprises a multiplexer 120 coupled to receive the multiple line outputs of the shifting storage register 12 at inputs 110 and having a single output line 122 coupled to a latch 124, the output of which is symbol output 72 (FIG. 2) on symbol output line 30. The selection addressing of the multiplexer 120 is controlled by a first ROM 126 or alternatively equivalent combinatorial logic circuitry. A plurality of decision subcircuits 128, 130 and 132 are each coupled to receive one input 101 from correlator 90 (FIG. 3) and to provide as output M bits each of address information to the first ROM 126. (The value M is selected to provide sufficient resolution to specify a value for confidence level of correlation and a value to select a tap position on the shifting storage register 12. A value for M is typically no less than 3 bits and no greater than 8 bits.) The decision subcircuits 128, 130 and 132 each comprise a binary storage shift register 134 and a second Read Only Memory 136. The storage capacity of the second Read Only Memory 136 is possibly as high as 8 Megabits. Each shift register 134 receives a succession of correlation coefficients at its input 101, wherein each input corresponds to one of the references 92, 94 and 96. A high-speed clock 26 shifts data through the shift register 134 at a speed greater than the input data rate. Within the decision subcircuits 128, 130, 132, the second ROM 136 is addressed by the parallel output of the shift register 134 to provide data output with each high-speed clock cycle. The outputs forming the address input to the first ROM 126 of all of the decision subcircuits 128, 130 and 132 consist of both an estimate of the center of the symbol in the shifting storage register 134 and a confidence level of that estimate based upon the shape and the peak value of the series of correlation coefficients sent from the correlator 90 for each one of the references.

The first ROM 126 is programmed with an address-to-data translation table to take the weighted estimates of the decision subcircuits 128, 130 and 132 as address inputs and thereby to produce as data outputs a composite estimate of the center of the symbol then appearing in the shifting storage register 12 (FIG. 3). The estimate is a digital value representing the address of the tap on the shifting storage register 12 (FIG. 1) which is closest to the center of the symbol at that clock cycle. A weighting function is precomputed which considers the magnitude of the confidence level. The weighted estimate of the symbol center is further adjusted through address lines 129 by the state of a divide-by-N counter 127 (which is used to convert the high speed clock 20 to the system clock output 32) in calculating the input address on data output lines 138 to the multiplexer 120. Thus, the full data output address of the first ROM 126 is the input address to the multiplexer 120 and is used to select the appropriate delayed symbol from inputs 110 which produces a transition closest to the center of the source symbol 42 (FIG. 2). The output of the multiplexer 120 on line 122 is provided to the latch 124, which is clocked by the CARRY output 131 at a timing point closest to the center of the symbol thereby to produce as a stream of recovered binary level data bits 72 (FIG. 2) on symbol output line 30 a recovered symbol exactly in synchronization with the recovered clock 82 (FIG. 2) on system clock output 32.

The weighting function which is precomputed to have its possible results stored in ROM 126 is given by the following expression:

$$TN = \left[ \frac{\sum_{A=1}^{k} [K + C_A] \cdot P_A}{\sum_{A=1}^{k} [K + C_A]} \right] + N_{MAX} - N$$

where:

TN is the Tap Number of the output 16 of the shifting storage register 12;

K is a weighting constant selected for each system;

$C_A$ is the confidence level for decision subcircuit k=A (128, 130, 132);

P is the tap position estimate given by each decision subcircuit 128, 130, 132;

$N_{MAX}$ is the number of cycle states of the divide-by-N circuit 127; and

N is the current state of the divide-by-N circuit 127.

The above function is a bit value voting technique which need be calculated only once for the discrete number of possible inputs, after which it is stored in ROM 126. The ROM 126 is used to examine simultaneously a plurality of sample time positions of a data symbol propagating through the shifting storage register 12.

The typical ROM size for a function with the needed resolution is about 6 Megabits. This size is considerably smaller (by several orders of magnitude) than a single ROM device which would receive as address input all of the inputs 101 and produce as data outputs the input address to multiplexer 120.

Figure 5:
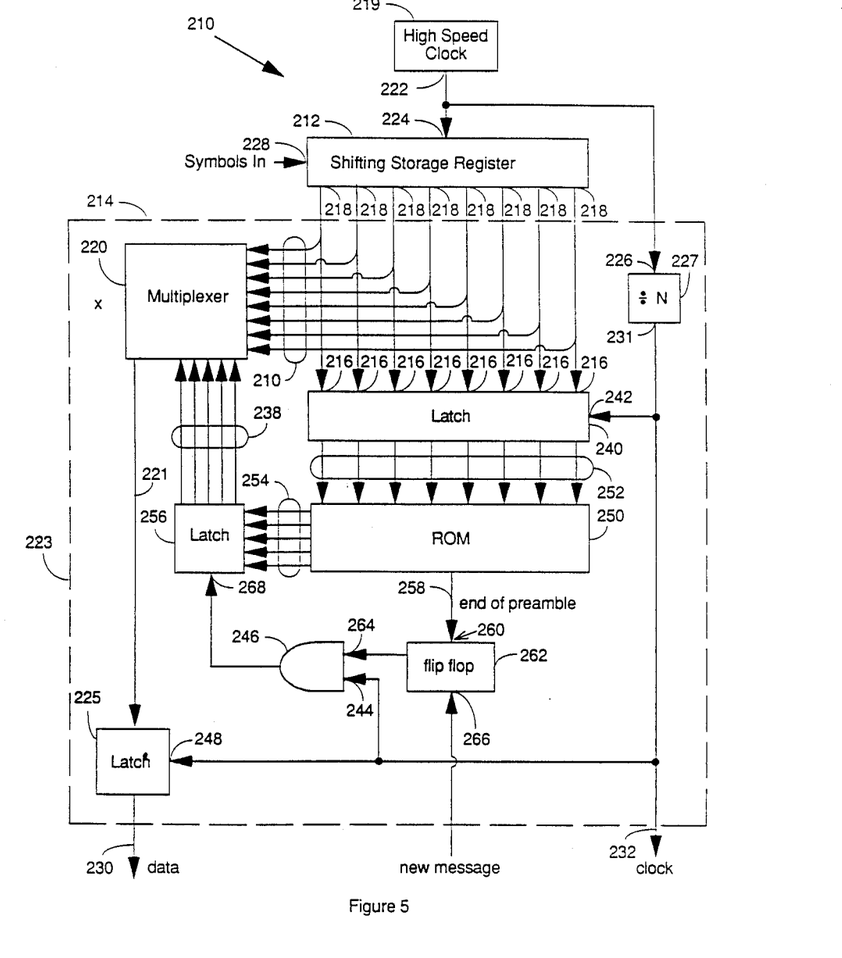
FIG. 5 is a block diagram of a second embodiment of a symbol synchronizer.

FIG. 5 is a preferred embodiment of a symbol synchronizer 210 for binary level signals in accordance with the invention. The symbol synchronizer 210 comprises a shifting storage register 212, a decision logic element 214 having parallel inputs 216 coupled to parallel register outputs 218 of the shifting storage register 212, and a high speed clock 219 whose high speed clock output 222 is provided to the respective clock inputs 224, 226 of both the shifting storage register 212 and the decision logic element 214. The shifting storage register 212 has a symbol input 228 for a single line (serial) input of binary level symbols. The decision logic element 214 has a symbol output 230 for a single line (serial) output of regenerated, resynchronized binary level symbols, as well as a clock output 232 for the reconstructed synchronous output clock for use in connection with the resynchronized symbols.

Within the decision logic element 214 is circuitry optimized for handling and recovery of binary level symbols. The inputs 216 are provided to a first latch set 240 (which is about two bits long consisting of about sixteen registers, for example) and in parallel to data inputs 210 of a multiplexer 220. The high-speed clock input 226 is provided to a divide-by-N counter 227 having a single CARRY output 231, which in turn is provided to clock input 242 of first latch 240, clock input 244 of a dual input AND gate 246, to clock input 248 to a second latch 224, and to system clock output 232.

The latched outputs of first latch set 240 are provided to address inputs of a ROM 250 on an address bus 252. The data outputs are provided on a data bus 254 to inputs of a second latch set 256 and on a data bit line 258 to a RESET input 260 of an R-S flip flop 262. The data output of the R-S flip flop 262 is provided to the second input 264 of the AND gate 246. The SET input 266 of the flip flop 262 is provided from an external digital signal source which pulses TRUE at the start of every new message (consisting of a preamble followed by group of symbols). At the beginning of a message, the data output of the flip flop 262 is thereby set to TRUE. The data line 258 carries a RESET signal. Whenever the end of the preamble of a message is detected, the RESET input 260 is set to TRUE, which TRUE is propagated immediately through the flip flop 262 as a FALSE signal to the second input 264 on AND gate 246. Such an end of preamble signal is detected when the address input to ROM 250 exhibits more than about one and one half bits worth of data of identical polarity. The preamble always comprises a string of alternating ones and zeroes so that the end of the preamble is signalled by the termination of that preamble pattern.

The output of the AND gate 246 is coupled to the latch enable input 268 of the second latch set 256 whereby a TRUE signal is used to latch the data output of the ROM 250, which is the estimate of value of the tap on the shifting storage register 212 corresponding to the center of the input symbol. Once the preamble terminates, the estimate of the value of the tap is no longer updated for the duration of the message. The system relies on its internal high-speed clock to maintain phase synchronization until the beginning of the next message.

The second latch 256 holds the estimate of value of the tap on the shifting storage register 212 corresponding to the center of the input symbol for the multiplexer 220 for the duration of the message. Multiplexer 220 is coupled to receive the multiple line outputs of the shifting storage register 212 at inputs 210 and has a single output line 221 coupled to a third latch 224, the output of which is symbol output 72 (FIG. 2) on symbol output line 230. The selection addressing of the multiplexer 220 is controlled by ROM 250 or alternatively equivalent combinatorial logic circuitry.

The output of the multiplexer 220 on line 221 is provided to the latch 224, which is clocked by the CARRY output 231 at a timing point closest to the center of the symbol thereby to produce as a stream of recovered binary level data bits 72 (FIG. 2) on symbol output line 230 a recovered symbol exactly in synchronization with the recovered clock 82 (FIG. 2) on system clock output 232.

Figure 6:
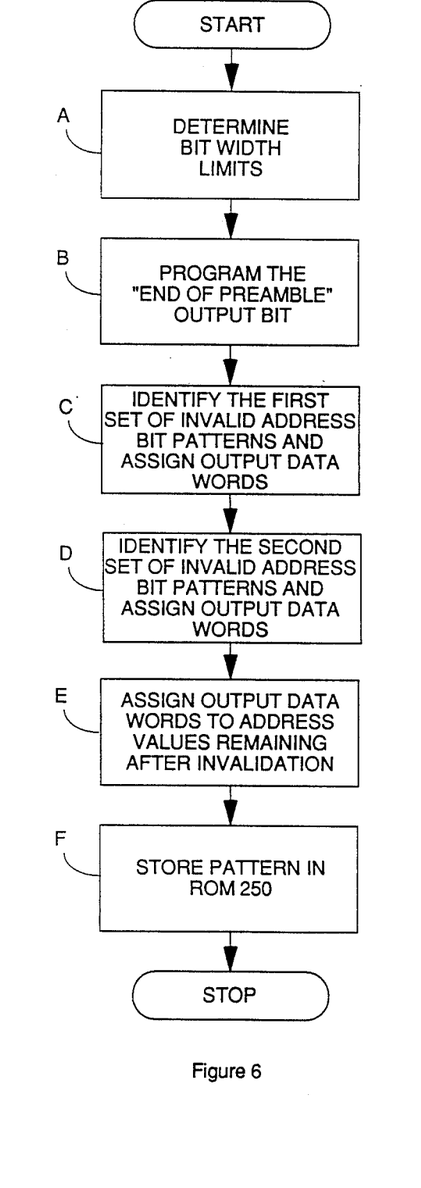
FIG. 6 is a flow chart illustrating the decision function whose results are stored in ROM 250 of FIG. 5.

One possible decision function which is precomputed to have its possible results stored in ROM 250 is given by the algorithm hereinafter described and shown in FIG. 6. Five computation steps are performed in sequence prior to storage of the results: Determine the bit width limits (Step A); program the "End of Preamble" output bit (Step B); identify the first set of invalid address bit patterns and assign appropriate output data words (Step C); identify the second and last set of invalid address bit patterns and assign appropriate output data words (Step D); and assign output data words to address values remaining after invalidation (Step E). The resultant pattern is stored in ROM 250 (Step F).

Each of the computation steps will now be outlined. This represents a narrative of the essential elements of the source code from which a skilled programmer could reproduce a suitable program.

A. Determine the maximum $N_{MAX}$ and minimum $N_{MIN}$ range of the preamble bit widths in terms of high speed clock cycles for both ones and zeroes. (The limits can be correlated by using a slicing level error parameter derived from the postulated input data stream whereby the factor which makes ones longer also makes zeroes shorter and visa versa.) Tabulate results and relationships in tabular form. A sample tabular results table is shown in TABLE I. This table illustrates the situation of four high speed clock cycles per bit and a ±25% range of variation of bit widths. Each column represents the width of a zero in high-speed clock cycle increments, and each row represents the width of a one in high-speed clock cycle increments.

| Zero | 1 | 2 | 3 | 4 | 5 | 6 | 7 | 8 |
|---|---|---|---|---|---|---|---|---|
| One |   |   |   |   |   |   |   |   |
| 1 | o | o | o | o | o | o | o | o |
| 2 | o | o | o | o | o | o | o | o |
| 3 | o | o | o | x | x | o | o | o |
| 4 | o | o | x | x | x | o | o | o |
| 5 | o | o | x | x | o | o | o | o |
| 6 | o | o | o | o | o | o | o | o |
| 7 | o | o | o | o | o | o | o | o |
| 8 | o | o | o | o | o | o | o | o | where a "o" represents an unacceptable combination of bit widths and an "x" represents an acceptable combination of bit widths.

B. Program the "End of Preamble" output bit. This is accomplished b examining all address values for the occurrence of contiguous bits of the same polarity in the ROM address and then setting the "End of Preamble" bit of the output of the ROM "TRUE" if there are ($2N_{MIN} - 1$) or more contiguous bits, otherwise setting it "FALSE".

C. Identify the first set of invalid address bit patterns and assign appropriate output data words. This is accomplished by examining all address values for the occurrence of contiguous bits of the same polarity, as above, for cases in which there are no contiguous bits of a number between $N_{MIN}$ and $N_{MAX}$. The output data of the ROM in such cases is programmed to represent as a default the center of the contiguous set which is closest to the range for $N_{MIN}$ and $N_{MAX}$. If two or more cases occur, the case with an odd number of bits is chosen. If two or more such cases occur, the case nearest the center of the address bits is chosen.

D. Identify the second (and last) set of invalid address bit patterns and assign appropriate output data words. This is accomplished by examining the remaining address values for the occurrence of contiguous bits of the same polarity, as above, for cases in which there are contiguous bits which do not match the criteria of acceptable width set out in TABLE I. Ignored are the identical contiguous bits which occur at each end of the ROM address. The output data of the ROM in such cases is programmed to represent as a default the center of the contiguous set which is closest to the range for $N_{MIN}$ and $N_{MAX}$. If two or more cases occur, the case with an odd number of bits is chosen. If two or more such cases occur, the case nearest the center of the address bits is chosen.

E. Assign output data words to address values remaining after invalidation. These are the desired valid patterns which will result from valid data bit patterns in the shifting storage register. There are four cases controlled by the hardware, each of which must be handled separately:
  I. One complete set contiguous bits of like values (examples 00011100 & 11000011);
  II. An odd number (more than one) of complete sets of contiguous bits of like values (examples 0001110000011100 & 1000011111000011);
  III. Two complete sets of contiguous bits of like values (examples 110000111100 & 110001111100); and
  IV. An even number (more than two) of complete sets of contiguous bits of like values (examples 0001110000011100001 & 10000111110000111100).

In case I. described above, where there is one set of contiguous bits of the same polarity that fall between $N_{MIN}$ and $N_{MAX}$ and the remaining bits on either side are of the opposite polarity and are both equal to or less than $N_{MAX}$ in number and continue to the edges of the address, as in the examples, then the following decision process is executed:
  (i) If there is an even number of bits, the output data word sent to the multiplexer is set to represent the location of the bit located at the "early" side of the center of the contiguous group of bits.
  (ii) If there is an odd number of bits, the output data word sent to the multiplexer is set to represent the location of the center bit of the contiguous group of bits.

In case II. described above, the following decision process is executed:
  (i) If there is an even number of total bits in the contiguous sets, the output data word sent to the multiplexer is set to represent the location of the bit located at the "early" side of the center of all of the contiguous group of bits.
  (ii) If there is an odd number of total bits in the contiguous sets, the output data word sent to the multiplexer is set to represent the location of the center bit of all of the contiguous group of bits.

In case III. described above, if there are two sets of contiguous bits of the same polarity that fall within the criteria described by the table derived in step 1 above, and the sets are of alternating polarity and the remaining contiguous two sets of bits on either side continue the alternating polarity and are both equal to or less than $N_{MAX}$ in number and continue to the edges of the address, the following decision process is executed:
  (i) Find the difference between twice the number of high speed clock cycles in two data bits and the total number of bits in the two sets.
  (ii) If the difference is zero, no noise effects may have occurred. Therefore:
    (a) Find the center of both sets.
    (b) See if the centers are displaced by the number of high-speed clock cycles per data bit.
    (c) If (b) above is TRUE, pick the number representing the center of the narrowest set as the output word, rounding early if rounding is necessary.
    (d) If (b) above is FALSE, round the values found for the centers to the earlier side, if rounding is necessary. Again try (b) above.
    (e) If (b) above is now TRUE, select the number representing the new center of the narrowest set as the output word.
    (f) If (b) above is still FALSE, select by default the number representing the new center of the narrowest set as the output word.
  (iii) If the difference is positive, noise effects have definitely narrowed the sets. Therefore:
    (a) Find the center of both sets.
    (b) See if the centers are displaced by the number of high-speed clock cycles per data bit.
    (c) If (b) above is TRUE, pick the number representing the center of the narrowest set as the output word, rounding early if rounding is necessary.
    (d) If (b) above is FALSE, widen the narrowest set by up to the difference found in (i) above until (b) above is TRUE. Pick the number representing the center of the widest set as the output word, rounding early if necessary.

(e) If (b) above is still FALSE, pick by default the number representing the center of the widest set as the output word, rounding early if necessary.

(iv) If the difference is negative, noise effects have definitely widened the sets. Therefore:

(a) Find the center of both sets.

(b) See if the centers are displaced by the number of high-speed clock cycles per data bit.

(c) If (b) above is TRUE, pick the number representing the center of the narrowest set as the output word, rounding early if rounding is necessary (d) If (b) above is FALSE, narrow the widest set by up to the value found in i) above to make b) above TRUE. Pick the number representing the center of the narrowest set as the output word, rounding early if necessary.

(e) If (b) above is still FALSE, pick by default the number representing the center of the narrowest set, rounding early if necessary, as the output word.

IV. In case IV. described above where there is an even number (more than two) of complete sets of contiguous bits of like values, the following decision process is executed:

(i) Consider the group of sets other than the left-most or right-most set, namely, whichever condition leaves the total number of bits in the remaining sets closest to the value predicted by taking the average number of ones in a contiguous set and the average number of zeroes in a contiguous set and multiplying those average numbers by the number of respective sets of likevalued bits in the reduced number of sets.

(ii) For the set identified in i) above, determine the total number of bits.

(a) If there is an even number of bits, set the output data word to be sent to the multiplexer to represent the location of the bit located at the early side of the center of the contiguous group of bits.

(b) If there is an odd number of bits, set the output data word to be sent to the multiplexer to represent the location of the center bit of the contiguous group of bits.

The foregoing processes represent one example for programming the ROM 250. The above process was selected to minimize the error rate of the regeneration process involving the clock and the data according to the invention. Other programming techniques might be employed based on other programming criteria or other constraints.

Figure 7:
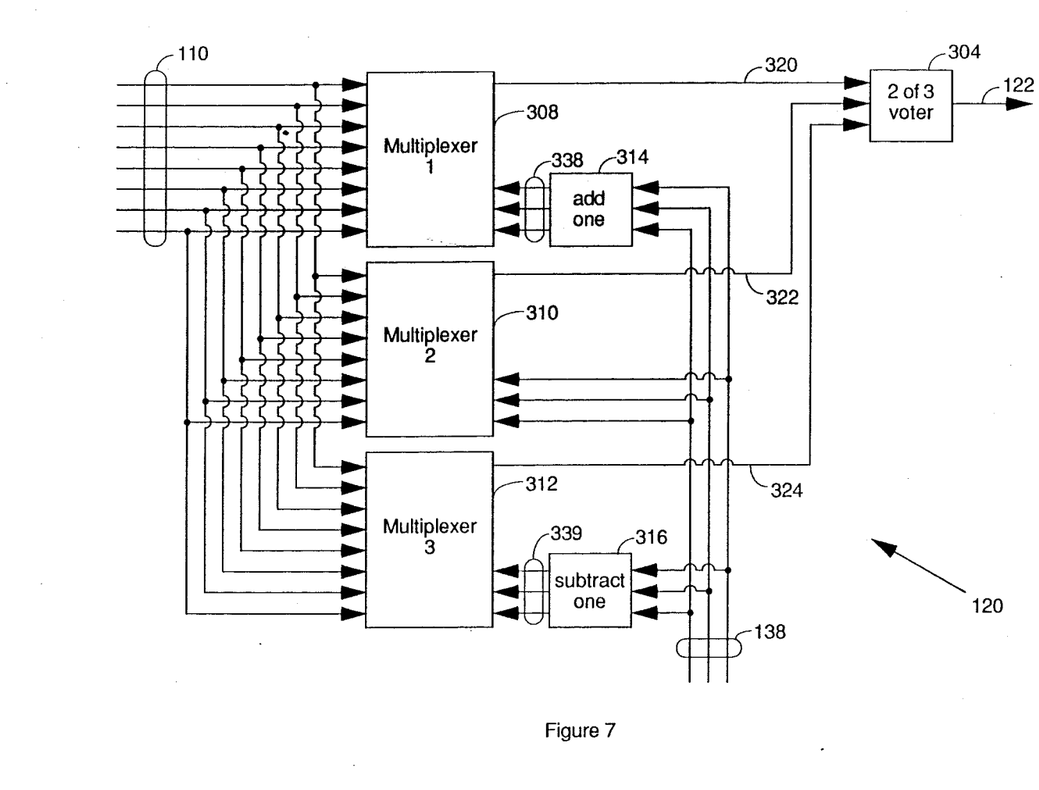
FIG. 7 is a block diagram of an apparatus for performing bit value voting according to the invention.

FIG. 7 illustrates in detail an embodiment for the multiplexer 120 of FIG. 4 (or 220 of FIG. 5) which is optimized to minimize the error in the regenerated bit value by use of a bit value voting technique. Inputs 110 produce outputs of the shifting storage register 12 (FIG. 3). The output of the multiplexer 120 on line 122 is provided to the latch 124 (FIG. 3). Control inputs 138 provide the selection signals. Multiplexer 120 may be subdivided into three multiplexer units 308, 310 and 312. Each of the multiplexer units 308, 310 and 312 are coupled to receive a complete set of the data inputs 110. Control inputs 138 are provided to each of the multiplexer units 308, 310 and 312. The first multiplexer unit 308 is provided with a control input 338 which is an incremented representation of the control input 138. An "add one" circuit 314 is provided for this purpose. The third multiplexer unit 312 is provided with a control input 339 which is a decremented representation of the control input 138. A "subtract one" circuit 316 is provided for this purpose. The second multiplexer unit 310 is coupled to receive the control input 138 directly.

The binary level output on lines 320, 322 and 324 from each of the respective multiplexer units 308, 310 and 312 is provided to a two-of-three voting device 304. The voting device 304 is commercially available as an integrated circuit, or it can be synthesized of a simple set of NAND gates and OR gates. It simply selects as its output the bit value corresponding to the majority of the three input bits.

The multiplexed outputs 320, 322 and 324 represent three adjacent positions on the output of the shifting storage register 12. The multiplexer units 308, 310 and 312 each examine those three positions simultaneously to yield the bit value at the three adjacent taps or positions. The two-of-three voting device 304 selects a bit value by comparing the three choices and choosing the majority.

The invention has now been described with reference to specific embodiments. Other embodiments will be apparent to those of ordinary skill in the art. It is therefore not intended that this invention be limited, except as indicated in the appended claims.

We claim:

1. A method for minimizing value errors in a recovered digital symbol represented by a digital data stream received at a head end in a synchronous data communications system, said synchronous data communication system having a single high-speed sampling clock device at said head end for generating a master clock as an integral part of a first message signal, said method comprising:

sampling with a first sampler at a local node said first message signal of said synchronous data communication system to obtain a first reconstructed message with an embedded master clock;

reconstructing at said local node, from said embedded master clock, a local clock which derives bit synchronization from said master clock;

setting at said local node a bit rate derived from said master clock;

transmitting to said head end a second message with a preamble and a second embedded clock derived from said local clock;

synchronizing in bit phase, at said head end, said second embedded clock with said master clock during a preamble time of said second message, wherein a second sampler at said head end over samples the received digital data stream containing said second message in order to partition bit periods for a symbol;

selecting an optimum sample time at least near the center of said a symbol during the preamble time; and employing said optimum sample time and said second embedded clock which has been bit phase-synchronized to said master clock to reconstruct said data symbol synchronously with said received digital data stream at said head end.

2. The method according to claim 1, for use in a head end apparatus having a shift register for storing samples of a binary digital data symbol, wherein said selecting step and said employing step comprise:

providing a Read Only Memory means (ROM) in which is stored estimates of the center of a symbol for all combinations of values provided through parallel output taps from cells of said shift register;

coupling tap outputs of said shift register to address input terminals of said ROM, said ROM being of adequate address width to accommodate at least one symbol; and using said ROM for selecting said optimum sample time by producing as data output of said ROM in response to said address signal input a tap value representing the center of the data symbol input to said shift register.

3. The method according to claim 2 wherein said ROM is used to examine simultaneously a plurality of sample time positions of a data symbol propagating through said shift register.

4. The method according to claim 2 wherein said optimum sample time selecting step further comprising the steps of:

providing said second message to a plurality of multiplexer units;

selecting a plurality of adjacent sample times estimated to bracket an optimum sample time for the second message;

generating first digital values of tap position, each one of said first digital values representative of one of said plurality of adjacent sample times;

providing each one of said first digital values as a control signal to a corresponding one of said multiplexer units to select a plurality of first binary-valued outputs in parallel from all of said multiplexer units;

producing by means of a voting mechanism a second binary-valued output representative of the majority of said first binary-valued outputs; and designating said second binary-valued output as the value of the received digital data stream for use as the value of the recovered digital symbol.

5. The method according to claim 2 wherein said sample time selecting step further includes the step of rounding to an integer a value designating tap position at or prior to a center of a preamble bit of the received digital data stream in order to compensate for late bias due to time quantization of sampling.

6. The method according to claim 1 for use in a head end apparatus having a shift register further comprising:

providing a Read Only Memory means (ROM) in which is stored estimates of the center of a plurality of consecutive symbols for all combinations of values provided through parallel output taps from cells said shift register;

coupling outputs of said taps of said shift register to address input terminals of the ROM, said ROM being of adequate address width to accommodate a plurality of symbols; and using said ROM for selecting said optimum sample time by producing as data output of said ROM in response to said address signal input a tap value representing an average of a plurality of centers of the data symbols which are input to said shift register.

7. The method according to claim 6 wherein said sample time selecting step further includes the step of rounding to an integer a value designating tap position at or prior to a center of a preamble bit of the received digital data stream in order to compensate for late bias due to time quantization of sampling.

8. The method according to claim 2 wherein said sample time selecting step further includes the step of employing a predetermined number of high-speed clock cycles as an aid in finding an end of a preamble which precedes an information portion of the received digital data stream.

9. The method according to claim 8 wherein said employing step includes determining the end of the preamble by sensing when two adjacent bits of the same polarity occur.

10. The method according to claim 1 wherein said received digital data stream comprises a multiple-level symbol, and wherein a multiple-level template is employed for each valid variation of the multiple-level symbol, said selecting step comprising cross-correlating the received digital data stream with each said multiple-level template to determine a best match, said best match being employed to designate position of an optimum sample position peak of the symbol.

11. An apparatus for minimizing value errors in a recovered digital symbol represented by a digital data stream received at a head end in a synchronous data communications system, said synchronous data communication system having a single high-speed sampling clock device at said head end for generating a master clock as an integral part of a first message signal, said apparatus comprising:

first means for sampling at a local node said first message signal of said synchronous data communication system to obtain a first reconstructed message with an embedded master clock;

means for reconstructing at said local node, from said embedded master clock, a local clock which derives bit synchronization from said master clock signal;

means for setting at said local node a bit rate derived from said master clock signal;

means for transmitting to said head end a second message signal with a preamble and a second embedded clock signal derived from said local clock;

means for synchronizing in bit phase, at said head end, said second embedded clock signal with said master clock during a preamble time of said second message, wherein a second sampler at said head end over samples the received digital data stream containing said second message in order to partition bit periods for a symbol;

means for selecting an optimum sample time at least near the center of said a symbol during the preamble time; and means for reconstructing said data symbol from said optimum sample time and said second embedded clock which has been bit phase-synchronized to said master clock synchronously with said received digital data stream at said head end.

12. The apparatus according to claim 11, for use in a head end apparatus having a shift register for storing samples of a binary digital data symbol, wherein said selecting means and said reconstructing means comprise:

Read Only Memory means (ROM) in which is stored estimates of the center of a symbol for all combinations of values provided through parallel output taps from a shift register;

a shift register means having tap outputs coupled to address input terminals of said ROM, said ROM being of adequate address width to accommodate at least one symbol; and means for using said ROM for selecting said optimum sample time by producing as data output of said ROM in response to said address signal input a tap value representing the center of the data symbol input to said shift register.

13. The apparatus according to claim 12 wherein said optimum sample time selecting means further comprises:
   a plurality of multiplexer units at said head end, each said multiplexer unit coupled to receive one bit of said received digital data stream;
   means coupled to said multiplexer means for selecting a plurality of adjacent sample times estimated to bracket an optimum sample time for the received digital data stream and generating first digital values, each one of said fist digital values representative of one of said plurality of adjacent sample times;
   means for providing each one of said first digital values as a control signal to a corresponding one of said multiplexer units to produce a plurality of first binary-valued outputs from all of said multiplexer units;
   means coupled to receive said first binary-valued outputs for voting a second binary-valued output representative of the majority of said first binary-valued outputs and designating said second binary-valued output as the value of the received digital data stream for use as the value of the recovered digital symbol.

14. The apparatus according to claim 12 wherein said optimum sample time selecting means further includes means for rounding to an integer a value designating tap position at or prior to a center of a preamble bit of the received digital data stream in order to compensate for late bias due to time quantization of sampling.

15. The apparatus according to claim 11 further comprising:
   Read Only Memory means (ROM) in which is stored estimates of the center of a symbol for all combinations of values provided through parallel output taps from cells of a shift register means;
   a shift register means having output taps coupled to address input terminals of said ROM, said ROM being of adequate address width to accommodate at least one symbol; and
   means for using said ROM for selecting said optimum sample time by producing as data output of said ROM in response to said address signal input a tap value representing an average of a plurality of centers of the data symbols which are input to said shift register.

16. The apparatus according to claim 15 wherein said optimum sample time selecting means further includes means for rounding to an integer a value designating tap position at or prior to a center of a preamble bit the received digital data stream in order to compensate for late bias due to time quantization of sampling.

17. The apparatus according to claim 12 wherein said optimum sample time selecting means further includes means for employing a predetermined number of high-speed clock cycles as an aid in finding an end of a preamble which precedes an information portion of the received digital data stream.

18. The apparatus according to claim 8 wherein said employing means includes means for determining the end of the preamble by sensing when two adjacent bits of the same polarity occur.

19. The apparatus according to claim 11 wherein said received digital data stream comprises a multiple-level symbol, and wherein a multiple-level template is employed for each variation of the multiple-level symbol, said selecting means further comprising means for cross-correlating the received digital data stream with each said multiple-level template to determine a best match, said best match being employed to designate position of an optimum sample position peak of the symbol.

* * * * *